US009701850B2

United States Patent
Pokorny et al.

(10) Patent No.: US 9,701,850 B2
(45) Date of Patent: *Jul. 11, 2017

(54) COATING COMPOSITIONS COMPRISING POLYMERIZABLE NON-IONIC SURFACTANT EXHIBITING REDUCED FINGERPRINT VISIBILITY

(71) Applicant: 3M INNOVATIVE PROPERTIES COMPANY, St. Paul, MN (US)

(72) Inventors: Richard J. Pokorny, Maplewood, MN (US); Thomas P. Klun, Lakeland, MN (US); Mahfuza B. Ali, Mendota Heights, MN (US); Daniel R. Cremons, North Oaks, MN (US); Michelle L. Toy, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/394,318

(22) PCT Filed: May 15, 2013

(86) PCT No.: PCT/US2013/041085
§ 371 (c)(1),
(2) Date: Oct. 14, 2014

(87) PCT Pub. No.: WO2013/191822
PCT Pub. Date: Dec. 27, 2013

(65) Prior Publication Data
US 2015/0126659 A1 May 7, 2015

Related U.S. Application Data

(60) Provisional application No. 61/661,567, filed on Jun. 19, 2012.

(51) Int. Cl.
*C09D 7/12* (2006.01)
*C09D 133/04* (2006.01)
(Continued)

(52) U.S. Cl.
CPC ......... *C09D 7/1233* (2013.01); *C09D 5/1687* (2013.01); *C09D 133/04* (2013.01); *C09D 175/00* (2013.01)

(58) Field of Classification Search
CPC .. C09D 7/1233; C09D 133/04; C09D 175/00; C09D 5/1687
See application file for complete search history.

(56) References Cited

U.S. PATENT DOCUMENTS

| 2,732,398 A | 1/1956 | Brice |
| 2,803,613 A | 8/1957 | Kather |

(Continued)

FOREIGN PATENT DOCUMENTS

| EP | 1311637 | 5/2003 |
| EP | 2042340 | 4/2009 |

(Continued)

OTHER PUBLICATIONS

Griffin, "Calculation of HLB Values of Non-Ionic Surfactants", Journal of the Society of Cosmetic Chemists. 1954, Vo. 5, pp. 249-259.

(Continued)

*Primary Examiner* — Satya Sastri
(74) *Attorney, Agent, or Firm* — Carolyn A. Fischer

(57) ABSTRACT

A coating composition is described comprising a polymerizable resin composition, a non-ionic unpolymerizable surfactant having an hydrophilic lipophilic balance ranging from 2 to 6, and a polymerizable surfactant. The surfactants are present at a concentration of greater than 10 wt-% solids. The non-ionic unpolymerizable surfactant and polymeriz- (Continued)

able surfactant are present at a weight ratio of less than 1.5:1. Also described are articles comprising the cured coating composition. The cured coating exhibits a property of an initially visible simulated fingerprint reducing in visibility within 60 minutes.

20 Claims, 2 Drawing Sheets

(51) Int. Cl.
C09D 175/00 (2006.01)
C09D 5/16 (2006.01)

(56) References Cited

U.S. PATENT DOCUMENTS

| | | | |
|---|---|---|---|
| 2,803,615 | A | 8/1957 | Ahlbrecht |
| 3,159,662 | A | 12/1964 | Ashby |
| 3,220,972 | A | 11/1965 | Lamoreaux |
| 3,250,808 | A | 5/1966 | Moore |
| 3,410,886 | A | 11/1968 | Joy |
| 3,544,537 | A | 12/1970 | Brace |
| 3,553,179 | A | 1/1971 | Bartlett |
| 3,718,631 | A | 2/1973 | Grosmangin |
| 4,013,615 | A | 3/1977 | Ohashi |
| 4,262,072 | A | 4/1981 | Wendling |
| 4,557,751 | A | 12/1985 | Ronning |
| 4,609,574 | A | 9/1986 | Keryk |
| 4,654,233 | A | 3/1987 | Grant |
| 4,728,571 | A | 3/1988 | Clemens |
| 4,855,184 | A | 8/1989 | Klun |
| 4,916,169 | A | 4/1990 | Boardman |
| 5,145,886 | A | 9/1992 | Oxman |
| 5,173,363 | A | 12/1992 | Fitch |
| 5,521,229 | A * | 5/1996 | Lu .............................. C08F 2/16 522/40 |
| 5,581,905 | A | 12/1996 | Huelsman |
| 5,648,407 | A | 7/1997 | Goetz |
| 5,670,557 | A * | 9/1997 | Dietz .................... A61F 13/023 522/184 |
| 5,674,561 | A * | 10/1997 | Dietz .................... A61F 13/023 427/208.4 |
| 5,677,050 | A | 10/1997 | Bilkadi |
| 5,694,701 | A | 12/1997 | Huelsman |
| 5,804,625 | A | 9/1998 | Temperante |
| 5,882,774 | A | 3/1999 | Jonza |
| 6,019,997 | A | 2/2000 | Scholz |
| 6,134,808 | A | 10/2000 | Yapel |
| 6,174,964 | B1 | 1/2001 | Jariwala |
| 6,224,949 | B1 | 5/2001 | Wright |
| 6,299,799 | B1 | 10/2001 | Craig |
| 6,368,699 | B1 | 4/2002 | Gilbert |
| 6,376,590 | B2 | 4/2002 | Kolb |
| 6,562,360 | B2 | 5/2003 | Scholz |
| 6,664,354 | B2 | 12/2003 | Savu |
| 6,893,731 | B2 | 5/2005 | Kausch |
| 6,995,222 | B2 | 2/2006 | Buckanin |
| 7,094,829 | B2 | 8/2006 | Audenaert |
| 7,098,429 | B2 | 8/2006 | Angermann |
| 7,153,563 | B2 * | 12/2006 | Shoshi ..................... C08J 7/047 428/220 |
| 7,192,795 | B2 | 3/2007 | Boardman |
| 7,241,437 | B2 | 7/2007 | Davidson |
| 7,439,279 | B2 | 10/2008 | Kondo |
| 7,718,264 | B2 | 5/2010 | Klun |
| 8,137,807 | B2 | 3/2012 | Clapper |
| 8,138,275 | B2 | 3/2012 | Jung |
| 8,742,022 | B2 * | 6/2014 | Pokorny .............. C08F 220/24 524/556 |
| 9,296,904 | B2 * | 3/2016 | Pokorny .............. C09D 5/1618 |
| 2003/0012936 | A1 | 1/2003 | Draheim |
| 2003/0065048 | A1 * | 4/2003 | Paul ..................... B65D 25/205 522/31 |
| 2003/0217806 | A1 | 11/2003 | Tait |
| 2004/0071974 | A1 * | 4/2004 | Shoshi ..................... C08J 7/047 428/421 |
| 2004/0077775 | A1 | 4/2004 | Audenaert |
| 2004/0184150 | A1 | 9/2004 | Johnson |
| 2005/0137355 | A1 | 6/2005 | Buckanin |
| 2005/0142362 | A1 * | 6/2005 | Inaoka ....................... C08J 3/28 428/411.1 |
| 2005/0249940 | A1 | 11/2005 | Klun |
| 2005/0250921 | A1 | 11/2005 | Qiu |
| 2007/0125451 | A1 | 6/2007 | Smith |
| 2007/0149650 | A1 | 6/2007 | Masuda |
| 2008/0160231 | A1 | 7/2008 | Newington |
| 2009/0064894 | A1 * | 3/2009 | Baumgart ................ C09D 1/00 106/18.32 |
| 2010/0016452 | A1 | 1/2010 | Nedwed |
| 2010/0035053 | A1 * | 2/2010 | Kishi .................... C08F 290/06 428/336 |
| 2010/0160595 | A1 | 6/2010 | Klun |
| 2010/0296049 | A1 | 11/2010 | Justynska |
| 2010/0310875 | A1 | 12/2010 | Hao |
| 2012/0088090 | A1 | 4/2012 | Miyazaki |
| 2012/0154811 | A1 | 6/2012 | Pokorny |
| 2012/0219782 | A1 | 8/2012 | Lee |
| 2012/0270980 | A1 | 10/2012 | Pokorny |
| 2014/0212651 | A1 | 7/2014 | Pokorny |

FOREIGN PATENT DOCUMENTS

| | | |
|---|---|---|
| JP | 9-67417 | 3/1997 |
| JP | 2007-262286 | 10/2007 |
| JP | 2010-90235 | 4/2010 |
| JP | 2010-241987 | 10/2010 |
| JP | 2011-037263 | 2/2011 |
| JP | 2012-106186 | 6/2012 |
| KR | 2002-0054756 | 7/2002 |
| KR | 2004-0087534 | 10/2004 |
| WO | WO 95-17303 | 6/1995 |
| WO | WO 99-39224 | 8/1999 |
| WO | WO 2006-102383 | 9/2006 |
| WO | WO 2008-067262 | 6/2008 |
| WO | WO 2009-029438 | 3/2009 |
| WO | WO 2009-032988 | 3/2009 |
| WO | WO 2009-076389 | 6/2009 |
| WO | WO 2009076389 A1 * | 6/2009 ........... C08G 65/007 |
| WO | WO 2009-090803 | 7/2009 |
| WO | WO 2009-148765 | 12/2009 |
| WO | WO 2010-053729 | 5/2010 |
| WO | WO 2011-034387 | 3/2011 |
| WO | WO 2012-087661 | 6/2012 |
| WO | WO 2013-191861 | 12/2013 |

OTHER PUBLICATIONS

Brunauer, "Adsorption of Gases in Multimolecular Layers", Contribution from the Bureau of Chemistry and Soils and George Washington University, Feb. 1938, vol. 60, pp. 309-319.
Sing, "Reporting Physisorption Data for Gas/Solid Systems with Special Reference to the Determination of Surface Area and Porosity", International Union of Pure and Applied Chemistry, IUPAC Publication, 1985, vol. 57, No. 4, pp. 603-619.
Ferguson, "Preparation, characterization and use in emulsion polymerization of acrylated alkyl ethoxylate surface-active monomers", Polymer, 1993, vol. 34, No. 15, pp. 3281-3292.
Davies, "A Quantitative Kinetic Theory of Emulsion Type. I. Physical Chemistry of the Emulsifying Agent", University Lecturer in Chemical Engineering, Cambridge, 1957, pp. 426-438.
Gutoff, "Coating and Drying Defects" Troubleshooting Operating Problems, (2001), 7 pages.
"Composition of Fingerprint Secretions", FIO Study Guides, undated, pp. 1-17.
International Search Report for PCT International Application No. PCT/US2013/041085, Aug. 16, 2013, 4 pages.

* cited by examiner

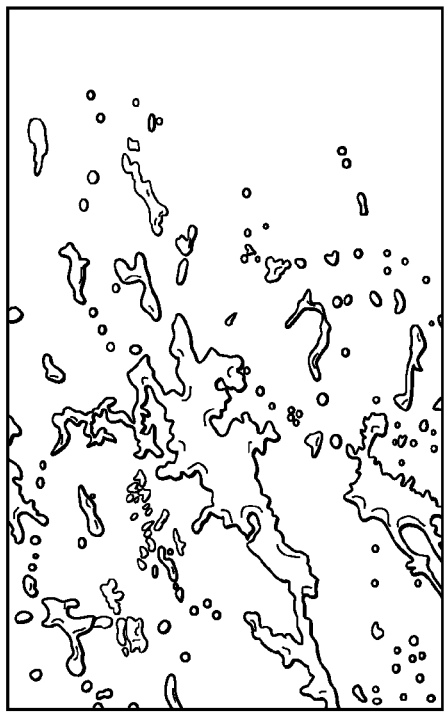 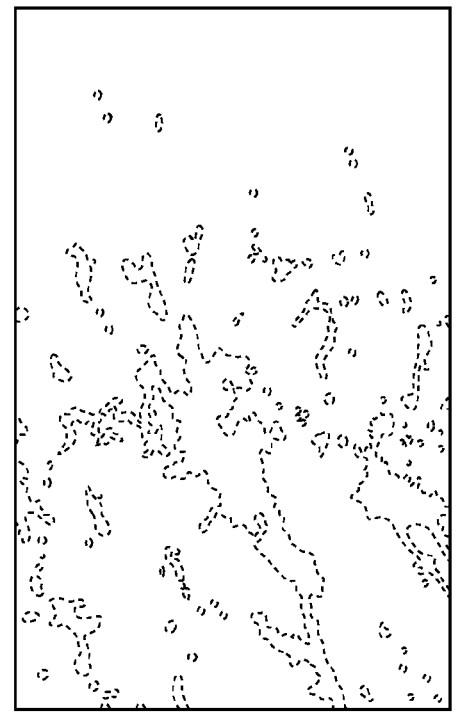
*FIG. 3A*   *FIG. 3B*

US 9,701,850 B2

COATING COMPOSITIONS COMPRISING POLYMERIZABLE NON-IONIC SURFACTANT EXHIBITING REDUCED FINGERPRINT VISIBILITY

CROSS REFERENCE TO RELATED APPLICATIONS

This is a national stage filing under 35 U.S.C. 371 of PCT/US2013/041085, filed May 15, 2013, which claims priority to U.S. Provisional Application No. 61/661,567, filed Jun. 19, 2012, the disclosure of which is incorporated by reference in their entirety herein.

BACKGROUND OF THE INVENTION

WO2008/067262 describes optical substrates having a surface layer that comprises the reaction product of a polymerizable mixture comprising at least one perfluoropolyether material comprising at least two free-radically polymerizable groups and at least one segment with greater than 6 ethylene oxide repeat units; and at least one non-fluorinated binder precursor comprising at least two free-radically polymerizable groups.

U.S. Pat. No. 7,153,563 describes a hard coat film comprising a substrate film and a hard coat layer disposed at least on one face of the substrate film, wherein the hard coat layer comprises 100 parts by weight of (A) a resin of an ionizing radiation curing type and 0.1 to 10 parts by weight of (B) a non-ionic surfactant. The hard coat film is used for protection of surfaces such as the surface of touch panels and displays. Attachment of fingerprints during input operations by fingers on the surfaces is suppressed and the attached fingerprints can be easily wiped out. Scratch resistance and wear resistance of conventional hard coat films are retained.

As described in the "Description of Related Art" in U.S. Pat. No. 7,153,563, to provide the property of preventing attachment of dirt and removing the attached dirt, it is frequently conducted that a silicone-based compound or a fluorine-based compound is added to conventional hard coat films having a hard coat layer which is formed and supported on a substrate film by curing by heating or with an ionizing radiation. However, the highly water-repellent surface obtained above does not always suppress the attachment of fingerprints and the attached fingerprints are more clearly visible. Conventional hard coat films have a drawback in that fingerprints are attached on the films after input operations with fingers and the attached fingerprints are not easily wiped out.

SUMMARY OF THE INVENTION

In one embodiment a coating composition is described comprising a polymerizable resin composition, a non-ionic unpolymerizable surfactant having an hydrophilic lipophilic balance ranging from 2 to 6, and a polymerizable surfactant. The surfactants are present at a concentration of greater than 10 wt-% solids. The non-ionic unpolymerizable surfactant and polymerizable surfactant are present at a weight ratio of less than 1.5:1.

Also described are articles comprising the cured coating composition. The cured coating exhibits a property of an initially visible simulated fingerprint reducing in visibility within 60 minutes.

BRIEF DESCRIPTION OF THE DRAWINGS

FIGS. 3A and 3B are illustrations of the photographs of FIGS. 2A and 2B respectively.

DETAILED DESCRIPTION AND PREFERRED EMBODIMENTS

Figure 1A:
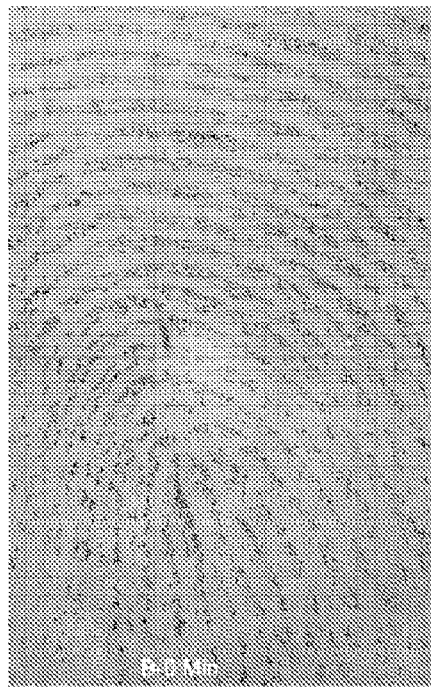
FIG. 1A is a digital photograph of a human fingerprint applied to a cured coating at a microscope setting of 12× (1.2× objective and a 10× multiplier).

The coating compositions described herein comprise a lipophilic liquid, such as a (e.g. non-ionic) surfactant. Such (e.g. non-ionic) surfactant is typically an unpolymerizable surfactant, meaning that the surfactant is not reacted or copolymerized with the other components of the coating composition. Hence, the (e.g. non-ionic) surfactant is unpolymerized in the cured coating composition. The (e.g. non-ionic) surfactant can also be characterized as "free" surfactant. The coating compositions further comprise apolymerizable surfactant in combination with the unpolymerizable surfactant. The coating composition preferably further comprises an additive comprising a low surface energy group, such as a silicone group or a fluorinated group. In some embodiments, the additive also comprises a hydrophobic group or a hydroxyl group.

Non-ionic surfactants are organic compounds that are amphiphilic, comprising a hydrophobic group (or "tail") and a hydrophilic group (or "head"). Typically surfactant molecules migrate to the surface, where the hydrophobic group may extend out of the bulk coating phase, while the water soluble head group remains in the bulk coating phase. This alignment and aggregation of surfactant molecules at the surface acts to alter the surface properties of the coating.

A surfactant can be classified by the presence of formally charged groups in its head. The head of an ionic surfactant carries a net charge. A non-ionic surfactant has no charged groups in its head.

Surfactants can be characterized by various methodologies. One common characterization method, as known in the art, is the hydrophilic-lipophilic balance ("HLB"). Although various method have been described for determining the HLB of a compound, unless specified otherwise, as used herein HLB refers to the value obtained by Griffin's method (See Griffin WC: "Calculation of HLB Values of Non-Ionic Surfactants," Journal of the Society of Cosmetic Chemists 5 (1954): 259). The computations were conducted utilizing the software program Molecular Modeling Pro Plus from Norgwyn Montgomery Software, Inc. (North Wales, Pa.).

According to Griffin's method:

$$HLB = 20 * M_h / M$$

where $M_h$ is the molecular mass of the hydrophilic portion of the molecule, and M is the molecular mass of the whole molecule. This computation provides a numerical result on a scale of 0 to 20, wherein "0" is highly lipophilic.

Griffin's method is typically used to calculate the HLB of a single molecule. However, various (e.g. commercially available) non-ionic surfactants comprise a mixture of molecules. When the surfactant comprises a mixture of molecules, the HLB can be calculated by the summation of the HLBs of the individual molecules multiplied by the weight fraction of each molecule.

A broad range of non-ionic surfactants may be utilized as the starting component in the synthesis of the additive. Without intending to be bound by theory, the additive is believed to act as a compatibilizer for the "free" surfactant that is unpolymerized in the cured coating composition. The HLB of surfactants for use as a starting component in the synthesis of the additive may range from 1 to 19. The non-ionic surfactant utilized as the starting component in the synthesis of the additive is typically free of fluorine and silicone atoms.

The unpolymerizable (e.g. non-ionic) surfactant of the coating composition is more lipophilic then hydrophilic, i.e., an HLB less than 10. In favored embodiments, the HLB is at least 2 or 2.5 and no greater than about 6 or 5.5. In some favored embodiments, the coating composition comprises a (e.g. non-ionic) surfactant having an HLB of at least 3, or 3.5, or 4.0. The unpolymerizable (e.g. non-ionic) surfactant of the coating composition is typically not a lipolytic enzyme, such as lipase. Lipolytic enzymes are generally more hydrophilic than lipophilic having an HLB greater than 6. Without intending to be bound by theory it is surmised that the lipophilic group of the surfactant may physically absorb the body oil of a fingerprint.

Such (e.g. non-ionic) surfactants generally comprise an alkyl or alkenyl group having at least 12, or 14, or 16, or 18 carbon atoms. Such relatively long chain alkyl or alkylene group is commonly referred to as a "fatty" group. The number of carbon atoms can be greater than 18 carbon atoms provided the (e.g. non-ionic) surfactant is a liquid at ambient temperature (e.g. 25° C.). The liquid (e.g. non-ionic) surfactant may further comprise up to 20 wt-% of a solid fraction. In some embodiments, the alkyl or alkenyl group has no greater than 24 carbon atoms. In some favored embodiments, such alkyl group is unbranched. The alkyl or alkenyl group may optionally comprise substituents, provided that the (e.g. non-ionic) surfactant is sufficiently lipophilic, e.g. having an HLB as previously described. The unpolymerizable non-ionic surfactant is also typically free of fluorine and silicone atoms.

Surfactants having the preferred HLB range (e.g. by inclusion of a fatty group) are generally non-ionic surfactants. However, other classes of surfactants may also be suitable provided such surfactant is sufficiently lipophilic as described herein.

Various classes of non-ionic surfactants are known including for example fatty alcohols, fatty acids, fatty amines, fatty amides, and derivatives thereof.

In some embodiments, such as for use as a starting compound in the synthesis of the additive, the non-ionic surfactant is a fatty alcohol. Fatty alcohols typically have the general formula

R—OH wherein R is a (e.g. straight or branched chain) alkyl or alkenyl group, as previously described, optionally substituted in available positions by N, O, or S atoms. Various fatty alcohols are known including dodecyl alcohol, cetyl alcohol $CH_3(CH_2)_{15}OH$, stearyl alcohol (also known as octadecyl alcohol or 1-octadecanol), and oleyl alcohol.

In some embodiments, the non-ionic surfactant is a derivative of a fatty alcohol. One favored derivative is a fatty alcohol, ester or derivative thereof comprising repeat units of ethylene oxide and/or repeat units of propylene oxide. Such derivatives may also be referred to as a polyethoxylated and/or polypropoxylated fatty alcohols, esters, or derivatives thereof. Such derivatives are a favored unpolymerizable non-ionic surfactant of the coating composition and can also be utilized as a starting compound in the synthesis of the additive. One illustrative commercially available surfactant of this type is available from Croda as "Brij O2", reported to have an HLB of 4.9. Such polyethoxylated alcohol comprises a mixture of molecules having the general formula

$C_{18}H_{35}(OCH_2CH_2)_nOH$

If "n" were 1, such structure has a calculated HLB of 3.6. Further, if "n" were 2, such structure has a calculated HLB of 5.4. If "n" were 0, such structure (i.e. oleyl alcohol) has a calculated HLB of 1.1.

In other embodiments, the non-ionic surfactant is a derivative of a fatty acid. Fatty acids typically have the formula

RC(O)OH where R is a (e.g. straight chain) alkyl or alkenyl group, as previously described One class of fatty acid derivative can be prepared by reacting a fatty acid with a short chain alkyl glycol mono alkyl ether. Illustrative non-ionic surfactants of this type are described in the following table.

| Surfactant | HLB |
|---|---|
| Reaction product of oleic acid and diethylene glycol monoethyl ether | 4.7 |
| Reaction product of oleic acid and dipropylene glycol monomethyl ether | 2.8 |
| Reaction product of oleic acid and triethylene glycol monoethyl ether | 6.2 |
| Reaction product of oleic acid and triethylene glycol mono-n-butyl ether | 5.1 |
| Reaction product of oleic acid and 1-methoxy-2-propanol | 2.0 |
| Reaction product of oleic acid and ethylene glycol monomethyl ether | 3.1 |

Such derivatives having a HLB no greater than 6, as previously described, are also favored unpolymerizable non-ionic surfactants of the coating composition and can also be utilized as a starting compound in the synthesis of the additive. Derivatives having HLB values of 6 or greater can be utilized in the synthesis of the additive.

The molecular weight of the (e.g. free) surfactant is typically at least 150 g/mole and generally no greater than 600 g/mole. In some embodiments, the molecular weight of the surfactant is at least 200 g/mole, 250 g/mole, or 300 g/mole.

The coating composition comprises a (e.g. free-radically) polymerizable non-ionic surfactant in combination with an unpolymerized surfactant. The concentration of polymerizable and unpolymerizable non-ionic surfactant is greater than 10 wt-% solids of the coating composition and typically no greater than 30 wt-%, or 25 wt-%, 20 wt-%. As used herein, "wt-% solids" refers to the total non-volatile components of the coating composition. The inclusion of a (e.g. free-radically) polymerizable non-ionic surfactant is amenable to compatibilizing the free surfactant. The inclusion of such can provide higher concentrations of free surfactant in combination with lower haze (as compared to the same concentration of free surfactant without a polymerizable surfactant). In some embodiments, the weight ratio of free surfactant to polymerizable surfactant is less than 1.5:1, such as 1.4:1; 1.3:1, 1.2:1, 1.1:1, 1:1. In favored embodiments, the amount of polymerizable surfactant exceeds the concentration of free surfactant. Thus the weight ratio of polymerizable surfactant to free surfactant is greater than 1:1. The weight ratio of polymerizable surfactant to free surfactant may be at least 1.5:1, or 2:1, or 2.5:1, or 3:1, and in some embodiments at least 4:1, 5:1, or 6:1 ranging up to about 10:1, 15:1, or 20:1.

Polymerizable surfactants have been described in the art. A non-ionic surfactant comprising a (meth)acrylate group can be formed by reacting the hydroxyl group of the previously described fatty alcohol derivatives thereof with a (meth)acrylic acid or a (meth)acryloyl halide, or functional (meth)acrylate compound such as an isocyanato-functional (meth)acrylate compound. In some embodiments, the polymerizable surfactant has an HLB ranging from 2 to 6. Replacing a single hydroxyl group with a (meth)acrylate group typically does not significantly change the HLB. Thus, the HLB of the polymerizable surfactant is about the same as the HLB of the unpolymerizable surfactant from which the polymerizable surfactant was derived. In some embodiments, the polymerizable surfactant has an HLB ranging from 2 to 13.

A polymerizable surfactant generally comprises a hydrophobic group, a hydrophilic group and a (free-radically) polymerizable group. In some embodiments, the polymerizable surfactant has the general formula:

$$R(OCH_2CH_2)_nOC(O)\text{—}C(R^6)H\text{=}CH_2$$

wherein R is a fatty group, as previously described, and n is the number of ethylene oxide repeat units, and $R^6$ is hydrogen or alkyl having from 1 to 4 carbon atoms. In some embodiments, n is at least 1, 2, or 3 and on average no greater than 20, 19, 18, 17, 16, 15, 14, 13, 12, 11 or 10. In some embodiments, the polymerizable surfactant comprises a mixture of molecules wherein n is 1 and n is 2. In some embodiments R is an alkyl group having at least 12, or 14, or 16, or 18 carbon atoms.

Polymerizable surfactants of this type may be obtained by reaction of a polyethoxylated alcohol, $R(OCH_2CH_2)_nOH$, with an (meth)acryloyl acid chloride, methacrylic or acrylic acid, or a (meth)acrylic anhydride.

In some embodiments, the polymerizable surfactant has the general formula:

$$R(OCH_2CH_2)_nOC(O)N(H)\text{—}CH_2\text{-}Q\text{-}[O\text{—}C(O)C(R^6)H\text{=}CH_2]_z$$

wherein R is a fatty group, as previously described, Q is a connecting group having a valency of at least 2, $R^6$ is hydrogen or alkyl having from 1 to 4 carbon atoms, and z is 1 or 2.

Polymerizable surfactants of this type may be obtained by reaction of an isocyanatoalkyl(meth)acrylates, such as isocyanatoethyl acrylate, isocyanatoethyl methacrylate, or 1,1-bis(acryloyloxymethyl)ethyl isocyanate, with the polyethoxylated alcohol, $R(OCH_2CH_2)_nOH$.

In favored embodiments, the coating composition comprises an additive comprising a low surface energy group, such as a silicone or fluorinated group. The additive may be present in an amount of at least 0.01, or 0.05, or 0.10, or 0.20, or 0.30, or 0.5 wt-% solids ranging up to about 10 wt-% solids of the coating composition. In some embodiments, the concentration of additive is no greater than about 5 wt-%, 4 wt-% or 3 wt-% or 2 wt-% or 1 wt-% solids of the coating composition.

In some embodiments, the inclusion of the additive provides lower fingerprint visibility as a function of time at the same surfactant concentration. In this embodiment, the coating composition further comprising the additive may have the same non-ionic surfactant concentration as previously described. The additive may also allow for higher concentrations of the non-ionic surfactant with lower haze.

The silicone group or fluorinated group generally lowers the surface energy of the coating composition and thus may be characterized as a low surface energy group. The silicone group is typically a polyorganosiloxane group; whereas the fluorinated group may comprises one or more perfluoroalkyl groups or a perfluoropolyether group. Further the additive may comprise a combination of such low surface energy groups.

The cured surface layer and coated articles may exhibit "ink repellency" when ink from a pen, commercially available under the trade designation "Sharpie", beads up into discrete droplets and can be easily removed by wiping the exposed surface with tissues or paper towels, such as tissues available from the Kimberly Clark Corporation, Roswell, Ga. under the trade designation "SURPASS FACIAL TISSUE."

A surface comprising the cured coating described herein preferably exhibits a high advancing contact angle with water of at least 70 degrees. More preferably, the advancing contact angle with water is at least 80 degrees and more preferably at least 90 degrees. Cured coating compositions comprising fluorinated additives and silicone additives (e.g. TEGO® Rad 2100) typically exhibit high advancing contact angles with water.

The surface comprising the cured coating described herein preferably exhibits a receding contact angle with hexadecane of at least 40, 45 or 50 degrees and typically no greater than 60 degrees.

In some embodiments, the additive comprises a low surface energy group and hydroxyl groups. The inclusion of the hydroxyl groups are surmised to provide the low lint attraction, as measured by the Cellulose Surface Attraction Test, described in the forthcoming examples. The cured surface layers preferably have a haze of less than 20%, more preferably less than 10% and even more preferably less than 5%, 4%, 3%, 2%, or 1% according to the Cellulose Surface Attraction Test.

For example, certain silicone additives have also been found to provide ink repellency in combination with low lint attraction, as described in WO 2009/029438; incorporated herein by reference. Such silicone(meth)acrylate additives generally comprise a polydimethylsiloxane (PDMS) backbone and at least one alkoxy side chain terminating with a (meth)acrylate group. The alkoxy side chain may optionally comprise at least one hydroxyl substituent. Such silicone (meth)acrylate additives are commercially available from various suppliers such as Tego Chemie under the trade designations TEGO Rad 2300 "TEGO Rad 2250", "TEGO Rad 2300", "TEGO Rad 2500", and "TEGO Rad 2700". Of these, "TEGO Rad 2100" provided the lowest lint attraction.

Based on NMR analysis "TEGO Rad 2100" and "TEGO Rad 2500" are believed to have the following chemical structure:

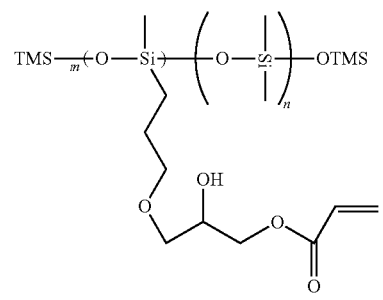

TEGO RAD 2100
TEGO RAD 2500 wherein n ranges from 10 to 20 and m ranges from 0.5 to 5.

In some embodiments, n ranges from 14 to 16 and n ranges from 0.9 to 3. The molecular weight typically ranges from about 1000 g/mole to 2500 g/mole.

Based on Thermal Gravimetric Analysis (according to the test method described in the example), silicone(meth)acrylates having a residue content of less than 12 wt-% provided the lowest haze values according to the Cellulose Surface Attraction Test.

In other embodiments, the additive does not consist of a (e.g. commercially available) additive having a polydimethylsiloxane backbone and a hydroxyl substituted side chain terminating with an acrylate group. Rather the additive comprises a polyurethane or polyacrylate backbone, such as described in US Patent Application Publication No. US2012/0154811 and cofiled 61/661,547; incorporated herein by reference. At least a portion of the hydroxyl groups are primary hydroxyl groups. (i.e. —CH$_2$OH) optionally in combination with secondary hydroxyl group R'R"CHOH where R', R", are divalent (e.g. alkylene, ether, or ester) groups.

In some embodiments, such as described in cofiled 61/661,547 the additive is generally prepared by polymerizing ethylenically unsaturated monomers such as monomers comprising at least one (meth)acrylate group, (meth)acrylamide, —SH, allyl or vinyl group. Such additives may comprise a poly(meth)acrylate backbone. (Meth)acrylate copolymers comprising perflurorpolyether moieties and the preparation thereof are described in WO2009/076389. Such preparations may employ chain transfer agents such as thiols, as well as thermal initiators such as peroxides and azo compounds.

In some embodiments, the additive may be represented by the general formulas:

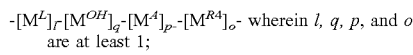
-[M$^L$]$_l$-[M$^{OH}$]$_q$-[M$^A$]$_p$-[M$^{R4}$]$_o$- wherein $l$, $q$, $p$, and $o$ are at least 1;

or

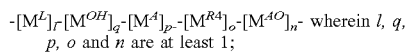
-[M$^L$]$_l$-[M$^{OH}$]$_q$-[M$^A$]$_p$-[M$^{R4}$]$_o$-[M$^{AO}$]$_n$- wherein $l$, $q$, $p$, $o$ and $n$ are at least 1;

wherein
[M$^L$] represent units derived from one or more ethylenically unsaturated monomers comprising a low surface energy silicone or flurorinated group;
[M$^{OH}$] represent units derived from one or more ethylenically unsaturated monomers and at least one hydroxyl group;
[M$^A$] represent units comprising a residue of [M$^{OH}$] and a free-radically polymerizable group;
[M$^{R4}$] represent units derived from one or more ethylenically unsaturated monomers comprising an alkyl group; and
[M$^{AO}$] represents units derived from one or more ethylenically unsaturated monomers having the group R—(O—R$_a$)$_j$ wherein R is an alkyl group having greater than 6, 7, or 8 carbon atoms, Ra is independently an alkylene group C$_x$H$_{2x}$ where x=2 to 4, and j ranges from 1 to 50.

R$^4$ is an alkyl group of 1-24 carbon atoms. R$^4$ may be a straight-chain, branched, or contain cycloalkyl moieties. In some embodiments, R$^4$ is a lower alkyl group comprising at least 1, 2, 3, or 4 carbon atoms (such as described for R$^6$). In other embodiments R$^4$ is a hydrophobic alkyl group comprising at least 6, 7, or 8 carbon atoms. In yet other embodiments, R$^4$ is a fatty alkyl group having at least 12, or 14, or 15, or 18 carbon atoms.

The number of each of the respective units can vary. For example, l, q, p, o may independently range from 1 to 100; whereas n can range from 0 to 100.

The number of 1 units, (i.e. units comprising the low surface energy group), are chosen such that the copolymer additive comprises about 5-50% by weight l units, more preferably about 10-40% by weight l units. The number of l units is equal to the sum of units comprising a silicone group, units comprising perfluoroalkyl containing groups, and units comprising perflurorpolyether groups. The polyacrylate additive may further comprise low surface energy groups derived from a chain transfer unit.

The number of q units (i.e. units comprising at least one hydroxyl group) are chosen such that the OH EW of the copolymer additive ranges from about 200 g/equivalent hydroxyl group to 2000 g/equivalent hydroxyl groups, and more preferably 250 g/equivalent OH to 750. On a weight percentage basis this is a range of about 10 to 50% by weight q units. (The copolymer intermediate, prior to converting a portion of the hydroxyl groups to free-radically polymerizable group has a higher hydroxyl content than the copolymer additive.)

The number of p units (i.e. units comprising at least one free-radically polymerizable group) which are derived from the q units, are chosen such that the copolymer additive comprises about 1 to 20% by weight p units, and more preferably 1.5 to 10% by weight p units.

The number of o units (i.e. units comprising an alkyl group) are chosen such that the copolymer additive comprises about 5-80% by weight o units, and more preferably 20-70% by weight o units. The polyacrylate additive may further comprise alkyl groups derived from a chain transfer unit. The number of o units of [M$^{R4}$] is equal to the sum of o and any units alkyl units derived from a chain transfer agent.

The number of optional n units (i.e. units comprising alkylene oxide repeat units and a hydrophobic group) are chosen such that the copolymer additive comprises about 0-50% by weight n units, and more preferably 10-50% by weight n units.

Other polyacrylate additives are described in US Patent Application Serial Publication Nos. US2012/0154811 and US2012/0270980; incorporated herein by reference. The polyacrylate additive may be represented by the general formulas:

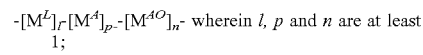
-[M$^L$]$_l$-[M$^A$]$_p$-[M$^{AO}$]$_n$- wherein $l$, $p$ and $n$ are at least 1;

or

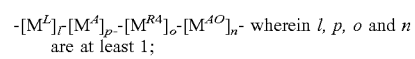
-[M$^L$]$_l$-[M$^A$]$_p$-[M$^{R4}$]$_o$-[M$^{AO}$]$_n$- wherein $l$, $p$, $o$ and $n$ are at least 1;

[M$^L$], [M$^A$], [M$^{R4}$], and [M$^{AO}$] as well as the preferred % by weight of each of the units are the same a previously described.

In other embodiments, the additives may comprise a polyurethane backbone, such as described in previously cited US Patent Application Publication Nos. US2012/0154811 and US2012/0270980; as well as WO2008/067262 and WO2009/076389; also incorporated herein by reference. Such additives are generally prepared by reacting at least one polyisocyanate with isocyanate reactive compounds having a low surface energy group and additional isocyanate reactive compounds having other groups, as desired.

In one embodiment, the additive may be represented by the general formula:

Ri-(NHC(O)XQR$^L$), —(NHC(O)OQ(A)p), —(NHC(O)X(C$_2$H$_4$O)$_j$R, wherein Ri is a residue of a multi-isocyanate;
R$^L$ is a low surface energy group;
X are each independently O, S or NR', where R' is H or lower alkyl of 1 to 4 carbon atoms;
Q is independently a connecting group of valency at least 2;
A is a (meth)acryl functional group such as —XC(O)C(R2)=CH2, where R2 is a lower alkyl of 1 to 4 carbon atoms or H or F;
R is a hydrophobic group, such as an alkyl or alkenyl group having at least 6, 7, or 8 carbon atoms as previously described;
p is 2 to 6; and
j preferably ranges from 7 to 50.

Q can comprise a bond or a straight chain, branched chain, or cyclic-containing connecting group. Q can include an alkylene, an arylene, an aralkylene, an alkarylene. Q can optionally include heteroatoms such as O, N, and S, and combinations thereof. Q can also optionally include a heteroatom-containing functional group such as carbonyl or sulfonyl, and combinations thereof.

In other embodiments j is 0, and thus the additive comprises a hydrophobic group in the absence of an (adjacent) ethylene oxide group or ethylene oxide repeat unit. The number of ethylene oxide repeat units (i.e. j) may also be 1, 2, 3, 4, 5, or 6.

As an alternative to the ethylene oxide repeat units, such compound may comprise other (e.g. C3-C4) alkylene oxide repeat units, such a propylene oxide repeat units or a combination of ethylene oxide repeat units and propylene oxide repeat units.

In some embodiments, R$^L$ is a monovalent perfluoropolyether moiety composed of groups comprising the formula F(RfcO)xCdF2d-, wherein each Rfc independently represents a fluorinated alkylene group having from 1 to 6 carbon atoms, each x independently represents an integer greater than or equal to 2, and wherein d is an integer from 1 to 6. In other embodiments, R$^L$ comprises one or more perfluororalkyl groups or a polyorganosiloxane group, as described in previously cited US Patent Application Publication Nos. US2012/0154811 and US2012/0270980.

The surfactants and additive, when present, are typically dispersed in a hardcoat composition in combination with a (e.g. alcohol based) solvent, applied to a surface or substrate, such as an optical substrate and photocured. The hardcoat is a tough, abrasion resistant layer that protects the optical substrate and the underlying display screen from damage from causes such as scratches, abrasion and solvents. Typically the hardcoat is formed by coating a curable liquid ceramer composition onto the substrate and curing the composition in situ to form a hardened film.

The coating composition described herein can be employed as a one-layer hardcoat composition. For embodiments wherein high durability is desired, the hardcoat composition typically further comprises (e.g. surface modified) inorganic particles, such as silica. The thickness of the hardcoat surface layer is typically at least 0.5 microns, preferably at least 5 micron, and more preferably at least 10 microns. The thickness of the hardcoat layer is generally no greater than 25 microns. Preferably the thickness ranges from 5 microns to 20 microns.

Alternatively, the coating composition may be free of inorganic oxides particles for uses where durability is not required. In yet other embodiments, an inorganic particle free surface layer may be provided in combination with an inorganic particle containing hardcoat layer disposed between the substrate and the surface layer. This will be referred to as a two-layer hardcoat. In these embodiments, the surface layer preferably has a thickness ranging from about 1 to 10 microns.

The coating compositions described herein are sufficiently durable such that the cured coating exhibits no evidence of scratching or only a few scratches (e.g. 1-3) when tested according to the steel wool abrasion resistance test method using a weight of 300 g and 10 wipes.

For one-layer hardcoat and two-layer hardcoat embodiments, the additive alone or in combination with other fluorinated compounds typically ranges from 0.01% to 10%, and more preferably from 0.1% to 5%, of the total solids of the hardcoat composition.

A variety of binder precursors that form a crosslinked polymeric matrix upon curing can be employed in the hardcoat. The isocyanate reactive non-fluorinated crosslinking materials previously described are suitable binder precursors.

Di(meth)acryl binder precursors include for example 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate.

Tri(meth)acryl binder precursor include for example glycerol triacrylate, trimethylolpropane triacrylate, ethoxylated trimethylolpropane triacrylates (e.g. having 3 to 20 ethoxylate repeat), propoxylated glyceral triacrylates, trimethylolpropane triacrylate, tris(2-hydroxyethyl)isocyanurate triacrylate. Higher functionality (meth)acryl containing compounds include for example ditrimethylolpropane tetraacrylate, dipentaerythritol pentaacrylate, ethoxylated pentaerythritol tetraacrylate, caprolactone modified dipentaerythritol hexaacrylate.

One commercially available form of pentaerythritol triacrylate ("PET3A") is SR444 and one commercially available form of pentaerythritol tetraacrylate ("PET4A") is SR295, each available from Sartomer Company of Exton, Pa.

In some embodiments, the binder precursor comprises a mixture of at a crosslinker (e.g. SR444) and at least one monomer comprising two or more (meth)acrylate groups and ethoxylate repeat units, propoxylate repeat units, or a mixture thereof (e.g. SR344). The weight ratio of crosslinker to such di(meth)acrylate may ranges from 1:2 to 2:1 and in some embodiments from 1:1.5 to 1.5:1. Such binder precursor can contribute less shrinkage and lower curl. Due to these properties the coating can be applied at increased thickness which in turn can improve the durability.

Oligomeric(meth)acryl such as urethane acrylates, polyester acrylates, epoxy acrylates; and polyacrylamide analogues of the foregoing can also be employed as the binder.

In one embodiment, the binder may comprise one or more N,N-disubstituted acrylamide and or N-substituted-N-vinylamide monomers as described in Bilkadi et al. The hardcoat may be derived from a ceramer composition containing about 20 to about 80% ethylenically unsaturated monomers and about 5 to about 40% N,N-disubstituted acrylamide monomer or N-substituted-N-vinyl-amide monomer, based on the total weight of the solids in the ceramer composition.

To facilitate curing, polymerizable compositions described herein may further comprise at least one free-radical thermal initiator and/or photoinitiator. Typically, such an initiator and/or photoinitiator are present in an amount less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.).

Useful free-radical thermal initiators include, for example, azo, peroxide, persulfate, and redox initiators, and combinations thereof Useful free-radical photoinitiators include, for example, those known as useful in the UV cure of acrylate polymers such as described in WO2006/102383.

The polymerizable composition for use as the surface layer or an underlying hardcoat layer preferably contains surface modified inorganic particles that add mechanical strength and durability to the resultant coating.

A variety of inorganic oxide particles can be used in the hardcoat. The inorganic oxide particles can consist essentially of or consist of a single oxide such as silica, or can comprise a combination of oxides, such as silica and aluminum oxide, or a core of an oxide of one type (or a core of a material other than a metal oxide) on which is deposited an oxide of another type. Silica is a common inorganic particle. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. No. 5,648,407 (Goetz et al.); U.S. Pat. No. 5,677,050 (Bilkadi et al.) and U.S. Pat. No. 6,299,799 (Craig et al.). Aqueous sols (e.g. of amorphous silica) can be employed. Sols generally contain at least 2 wt-%, at least 10 wt-%, at least 15 wt-%, at least 25 wt-%, and often at least 35 wt-% colloidal inorganic oxide particles based on the total weight of the sol. The amount of colloidal inorganic oxide particle is typically no more than 50 wt-% or 45 wt-%. The surface of the inorganic particles can be "acrylate functionalized" as described in Bilkadi et al. The sols can also be matched to the pH of the binder, and can contain counter ions or water-soluble compounds (e.g., sodium aluminate), all as described in Kang et al. '798.

Various high refractive index inorganic oxide particles can be employed such as for example zirconia ("$ZrO_2$"), titania ("$TiO_2$"), antimony oxides, alumina, tin oxides, alone or in combination. Mixed metal oxide may also be employed. Zirconias for use in the high refractive index layer are available from Nalco Chemical Co. under the trade designation "Nalco OOSSOO8" and from Buhler AG Uzwil, Switzerland under the trade designation "Buhler zirconia Z—WO sol". Zirconia nanoparticle can also be prepared such as described in U.S. Pat. Nos. 7,241,437 and 6,376,590.

The inorganic nanoparticles are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing. The incorporation of surface modified inorganic particles is amenable to covalent bonding of the particles to the free-radically polymerizable organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependant upon several factors such as particle size, particle type, modifier molecular wt, and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl) methoxyethoxyethyl carbamate, N-(3-triethoxysilylpropyl) methoxyethoxyethyl carbamate, 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxyl)ethoxy]acetic acid (MEEAA), beta-carboxyethylacrylate (BCEA), 2-(2-methoxyethoxyl)acetic acid, methoxyphenyl acetic acid, and mixtures thereof.

The surface modification of the particles in the colloidal dispersion can be accomplished in a variety of known ways, such as described in U.S. Pat. Nos. 7,241,437 and 6,376,590.

A combination of surface modifying agents can be useful, wherein at least one of the agents has a functional group co-polymerizable with a hardenable resin. Combinations of surface modifying agent can result in lower viscosity. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide.

A preferred combination of surface modifying agent includes at least one surface modifying agent having a functional group that is copolymerizable with the organic component of the polymerizable resin and a second amphiphilic modifying agent, such as a polyether silane, that may act as a dispersant. The second modifying agent is preferably a polyalkyleneoxide containing modifying agent that is optionally co-polymerizable with the organic component of the polymerizable composition.

Surface modified colloidal nanoparticles can be substantially fully condensed. Non-silica containing fully condensed nanoparticles typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

The inorganic particles preferably have a substantially monodisperse size distribution or a polymodal distribution obtained by blending two or more substantially monodisperse distributions. Alternatively, the inorganic particles can be introduced having a range of particle sizes obtained by grinding the particles to a desired size range. The inorganic oxide particles are typically non-aggregated (substantially discrete), as aggregation can result in optical scattering (haze) or precipitation of the inorganic oxide particles or gelation. The inorganic oxide particles are typically colloidal in size, having an average particle diameter of 5 nanometers to 100 nanometers. The particle size of the high index inorganic particles is preferably less than about 50 nm in order to provide sufficiently transparent high-refractive index coatings. The average particle size of the inorganic oxide particles can be measured using transmission electron microscopy to count the number of inorganic oxide particles of a given diameter.

The coating composition described herein can be used to form a (e.g. cured) surface layer, a coated article, or a coated surface such as by applying the coating composition to a surface (e.g. of a substrate or article) and curing polymerizable components of the coating composition. Once polymerizable components present in the coating composition have been cured, a suitable solvent (such as hexane in some embodiments) can be used to extract the lipophilic liquid, such as the unpolymerizable surfactant, from the coated surface or cured coating composition.

The coated surface typically comprises a polymeric organic material comprising a plurality of pores. Although the cured coating composition (i.e. surface layer) may comprise nano-sized pores (e.g. less than 200, or 100, or 50 nanometers), the cured coating is typically free of pores of 1 micron or greater. In some embodiments, the average diameter of the pores is at least 10, 15, or 20 nanometers.

A portion of the pores are interconnected, forming a network (e.g. of tunnels). The lipophilic liquid (e.g. unpolymerizable surfactant) is present in the pores of the polymeric organic material. Without intending to be bound by theory, it is surmised that the wt-% of extractable lipophilic liquid (e.g. unpolymerizable surfactant) relates to the extent of interconnectivity of the pores, as well as the concentration of lipophilic liquid (e.g. unpolymerizable surfactant) present in the coating of the coated surface. It has been found that when a coating composition comprises a low amount of unpolymerizable surfactant (e.g. about 3 wt-%), the amount of lipophilic extractable material relative to the total weight of the coating composition is less than 0.02 wt-%. At this relatively low concentration of free lipophilic liquid (i.e. not covalently bonded to the polymeric organic material), the lipophilic liquid is surmised to be evenly distributed throughout the coated surface. Although a small portion of the lipophilic liquid is exposed at the outermost surface, the majority of the lipophilic liquid is within the cured coating beneath the exposed surface, resulting in only a fraction of the total amount of lipophilic liquid being extractable.

However, when the coating composition comprises greater amounts of lipophilic liquid (e.g. unpolymerizable surfactant) the (i.e. cured) coating composition comprises at least 0.5, 1, 2, 3, 4, or 5 wt-% of solvent extractable lipophilic material. The concentration of material that can be solvent extracted from the coated surface is typically no greater than 15 wt-% and in favored embodiments, no greater than 10 wt-%.

As the concentration of lipophilic liquid (e.g. unpolymerizable surfactant) increases, the number and/or size of the pores increase such that a network of interconnected pores is formed. This may be caused by nanoscopic phase separation of the lipophilic liquid (e.g. unpolymerizable surfactant) from the polymerized resin. If all the lipophilic liquid (e.g. unpolymerizable surfactant) was accessible for extraction, then all the lipophilic liquid would be present in pores exposed to the surface as isolated pores, interconnected pores, or a combination thereof. Thus, 100% of the total pores are present as isolated pores, interconnected pores, or a combination thereof. Typically, less than all the lipophilic liquid (e.g. unpolymerizable surfactant) is solvent extractable from the coated surface. For example, in some embodiments, typically no greater than 90 wt-% or 95 wt-% of the total lipophilic liquid (e.g. unpolymerizable surfactant) is solvent extractable from the cured coating. Thus, 5 or 10% of the lipophilic liquid-containing pores are unexposed to the surface as buried pores. In some embodiments, at least 10, 15, 20, 25, 30, 35, 40, 45, or 50% of the lipophilic liquid-containing pores are exposed to the surface as isolated pores, interconnected pores, or a combination thereof. Further, the lipophilic liquid-containing pores exposed to the surface as isolated pores, interconnected pores, or a combination thereof, may range up to 75, 80, 85, or 90%.

The pore volume of a (e.g. cured) coating or coated (e.g. film) surface can be determined using various techniques in the art. One technique developed by Brunauer, Emmett and Teller, see S. Brunauer, "Physical Adsorption" (Princeton University Press, Princeton, N. J., 1945, is commonly referred to as "BET" gas adsorption. In some embodiments, the coated surface described herein comprises a plurality of pores having a pore volume of at least 0.01 cc/g, or 0.02 cc/g. In some embodiments, the pore volume is no greater than 0.15 cc/g, or no greater than 0.10 cc/g, or no greater than 0.09 cc/g, or no greater than 0.08 cc/g, or no greater than 0.07 cc/g. BET gas adsorption can also be used to determine the surface area of a surface. In some embodiments, the surface area of the coated surface described herein is at least 1 $m^2/g$, or 5 $m^2/g$, or 10 $m^2/g$. The surface area is typically no greater than 50 $m^2/g$, or 45 $m^2/g$, or 40 $m^2/g$, or 35 $m^2/g$, or 30 $m^2/g$.

In some embodiments, a gas adsorption isotherm of the coated surface has a Type H2 hysteresis loop, as described in the IUPAC publication "Reporting Physisorption Data for Gas/Solid Systems with Special Reference to the Determination of Surface Area and Porosity", Pure & Applied Chemistry, Volume 57, No. 4, pp. 603-619, 1985. A Type H2 hysteresis loop is characteristic of a system of disordered pores (i.e. random spatial arrangement of the pores) in a network of interconnected pores with some pore blocking (i.e. necking or small diameter passages between pores that provide some resistance to flow between interconnected pores.

The optical film having a surface layer of the cured coating as described herein may have a gloss or matte surface. Matte films typically have lower transmission and higher haze values than typical gloss films. Whereas gloss surfaces typically have a gloss of at least 130 as measured according to ASTM D 2457-03 at 60°; matte surfaces have a gloss of less than 120. In some embodiments, the haze is less than 5%, or 2.5%, or 1% depending on the intended end use as measured according to ASTM D1003.

A particulate matting agent can be incorporated into the polymerizable composition in order to impart anti-glare properties to the surface layer as described in WO2008/067262. The particulate matting agent can prevent uneven coloration caused by interference with an associated hard coat layer. One commercially available silica particulate matting agent having an average particle size of 3.5 microns is commercially available from W.R. Grace and Co., Columbia, Md. under the trade designation "Syloid C803".

The coating composition may optionally comprise an antistatic agent as described in WO2008/067262. Various antistatic particles are commercially available as water-based and solvent-based.

The non-ionic surfactant, additive when present, and hardcoat composition can be dispersed in a solvent to form a dilute coating composition. The amount of solids in the coating composition is typically at least 20 wt-% and usually no greater than about 75 wt-%. For some optical substrate such as polycarbonate, acrylic, cellulose acetate, and cellulose triacetate, it is preferred to employ an alcohol based solvent including for example methanol, ethyl alcohol, isopropyl alcohol, propanol, etc. as well as glycol ethers such as propylene glycol monomethyl ether or ethylene glycol monomethyl ether, etc. For such optical substrates, the coating compositions may contain predominantly alcohol solvent(s). For other uses, however, alcohol based solvent(s) may be combined with other (i.e. non-alcohol) solvents.

Thin coating layers can be applied to the optical substrate using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY ISBN 0-471-59810-0.

A die coater generally refers to an apparatus that utilizes a first die block and a second die block to form a manifold cavity and a die slot. The coating fluid, under pressure, flows through the manifold cavity and out the coating slot to form a ribbon of coating material. Coatings can be applied as a single layer or as two or more superimposed layers. Although it is usually convenient for the substrate to be in the form of a continuous web, the substrate may also be a succession of discrete sheets.

Any surface that is routinely touched could benefit from the coating composition described herein. Examples include optical displays (e.g., television screens, computer screens, cell phone screens, console displays in automobiles), optical films (e.g., screen protectors, privacy films), automobile windows, consumer appliances (e.g., stove top, outer surfaces of refrigerator), etc.

The term "optical display", or "display panel", can refer to any conventional optical displays, including but not limited to multi-character multi-line displays such as liquid crystal displays ("LCDs"), plasma displays, front and rear projection displays, cathode ray tubes ("CRTs"), and signage, as well as single-character or binary displays such as light emitting diodes ("LEDs"), signal lamps, and switches. The exposed surface of such display panels may be referred to as a "lens." The invention is particularly useful for displays having a viewing surface that is susceptible to being touched or contacted by ink pens, markers and other marking devices, wiping cloths, paper items and the like.

The coatings of the invention can be employed in a variety of portable and non-portable information display articles. These articles include PDAs, cell phones (including combination PDA/cell phones), LCD televisions (direct lit and edge lit), touch sensitive screens, wrist watches, car navigation systems, global positioning systems, depth finders, calculators, electronic books, CD and DVD players, projection television screens, computer monitors, notebook computer displays, instrument gauges, instrument panel covers, signage such as graphic displays and the like. The viewing surfaces can have any conventional size and shape and can be planar or non-planar, although flat panel displays are preferred. The coating composition or coated film, can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, road pavement markers (e.g. raised) and pavement marking tapes, overhead projectors, stereo cabinet doors, stereo covers, watch covers, as well as optical and magneto-optical recording disks, and the like.

A variety of substrates can be utilized in the articles of the invention. Suitable substrate materials include glass as well as thermosetting or thermoplastic polymers such as polycarbonate, poly(meth)acrylate (e.g., polymethyl methacrylate or "PMMA"), polyolefins (e.g., polypropylene or "PP"), polyurethane, polyesters (e.g., polyethylene terephthalate or "PET"), polyamides, polyimides, phenolic resins, cellulose diacetate, cellulose triacetate, polystyrene, styrene-acrylonitrile copolymers, epoxies, and the like.

Such substrates are typically non-absorbent with respect to both aqueous solutions and oils.

Typically the substrate will be chosen based in part on the desired optical and mechanical properties for the intended use. Such mechanical properties typically will include flexibility, dimensional stability and impact resistance. The substrate thickness typically also will depend on the intended use. For most applications, a substrate thickness of less than about 0.5 mm is preferred, and is more preferably about 0.02 to about 0.2 mm. Self-supporting polymeric films are preferred. Films made from polyesters such as PET or polyolefins such as PP (polypropylene), PE (polyethylene) and PVC (polyvinyl chloride) are particularly preferred. The polymeric material can be formed into a film using conventional filmmaking techniques such as by extrusion and optional uniaxial or biaxial orientation of the extruded film. The substrate can be treated to improve adhesion between the substrate and the hardcoat layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion.

Various light transmissive optical films are known including but not limited to, multilayer optical films, microstructured films such as retroreflective sheeting and brightness enhancing films, (e.g. reflective or absorbing) polarizing films, diffusive films, as well as (e.g. biaxial) retarder films and compensator films such as described in U.S. Patent Application Publication No. 2004/0184150.

As described is U.S. Patent Application Publication 2003/0217806, multilayer optical films provide desirable transmission and/or reflection properties at least partially by an arrangement of microlayers of differing refractive index. The microlayers have different refractive index characteristics so that some light is reflected at interfaces between adjacent microlayers. The microlayers are sufficiently thin so that light reflected at a plurality of the interfaces undergoes constructive or destructive interference in order to give the film body the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 µm. However, thicker layers can also be included, such as skin layers at the outer surfaces of the film, or protective boundary layers disposed within the film that separate packets of microlayers. Multilayer optical film bodies can also comprise one or more thick adhesive layers to bond two or more sheets of multilayer optical film in a laminate.

Further details concerning multilayer optical films and related constructions can be found in U.S. Pat. No. 5,882,774 (Jonza et al.), and PCT Publications WO95/17303 (Ouderkirk et al.) and WO99/39224 (Ouderkirk et al.). Polymeric multilayer optical films and film bodies can comprise additional layers and coatings selected for their optical, mechanical, and/or chemical properties. See U.S. Pat. No. 6,368,699 (Gilbert et al.). The polymeric films and film bodies can also comprise inorganic layers, such as metal or metal oxide coatings or layers.

Various permanent and removable grade adhesive compositions may be coated on the opposite side (i.e. to the hardcoat) of the substrate so the article can be easily mounted to a display surface. Suitable adhesive compositions include (e.g. hydrogenated) block copolymers such as those commercially available from Kraton Polymers of Westhollow, Texas under the trade designation "Kraton G-1657", as well as other (e.g. similar) thermoplastic rubbers. Other exemplary adhesives include acrylic-based, urethane-based, silicone-based, and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Patent Application Publication No. 2003/0012936. Several of such adhesives are commercially available from 3M Company, St. Paul, Minn. under the trade designations 8141, 8142, and 8161.

The visibility of a fingerprint initially or as a function of time can be determined by various methods. Preferably, however, such assessment is made using a reproducible standardized method. One method of determining the fingerprint visibility of a coating composition comprises providing a coating composition on a substrate, applying a simulated fingerprint composition onto the coated substrate, and measuring an optical property of the simulated fingerprint composition on the coated substrate. If the measured optical property is for example transmission or haze, the substrate to which the coating composition is applied is a light-transmissible (e.g. transparent) substrate. However, if the optical property is for example gloss, the substrate may alternatively be an opaque substrate.

The simulated fingerprint composition is generally a highly lipophilic substance. The simulated fingerprint composition is typically a mixture of a fatty substance that is predominantly a solid at ambient temperature (25° C.) and an oily substance that is predominantly a liquid at ambient temperature (25° C.). Vegetable shortening is a suitable solid; whereas a fatty alkyl oxide wherein the alkyl group has at least 24 carbon atoms, such as available from Sigma under the trade designation "Triolein", is a suitable liquid. The simulated fingerprint may be applied to the (i.e. cured) coating using a variety of techniques. The oily substance may be diluted with for example a (e.g. alcohol) solvent in order to reduce the viscosity and evenly apply a thin coating (e.g. a thickness of 1.2 microns). A rubber stopper can conveniently be used to provide a continuous coating. However, other rubber stamp designs, or a sandpaper roughened rubber stopper or surface could be utilized to provide a discontinuous coating.

For embodiments wherein the coating composition is a polymerizable composition, the coating composition is cured prior to applying the simulated fingerprint. For embodiments wherein the coating composition comprises a solvent, the coating composition is dried prior to applying the simulated fingerprint.

The optical property, such as haze may be measured initially and after a duration of time. The duration of time may be 1, 2, 3, 4, or 5 minutes or longer durations of times, such as 20, 40 or 60 minutes. One suitable method for determining fingerprint visibility is described in greater detail in the forthcoming examples.

By comparing the initial (e.g. simulated) fingerprint visibility to the visibility after a duration of time (e.g. 20 minutes), one can calculate a ratio by dividing the visibility after a duration of time by the initial visibility. When the ratio is 1, there is no change in the visibility of a (e.g. simulated) fingerprint as a function of time. As the ratio, becomes smaller, the change in visibility become greater. In some embodiments, the cured coating described herein exhibits a ratio of simulated fingerprint visibility after a duration of time (e.g. at 60 minutes) to initial simulated fingerprint visibility of less than 0.80, or 0.70, or 0.60, or 0.50.

Figure 1B:
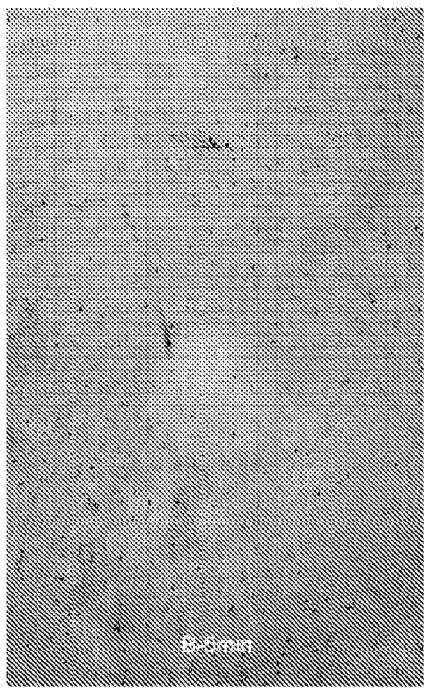
FIG. 1B is a digital photograph of the human fingerprint applied to the cured coating of FIG. 1A five minutes later.
Figure 2A:
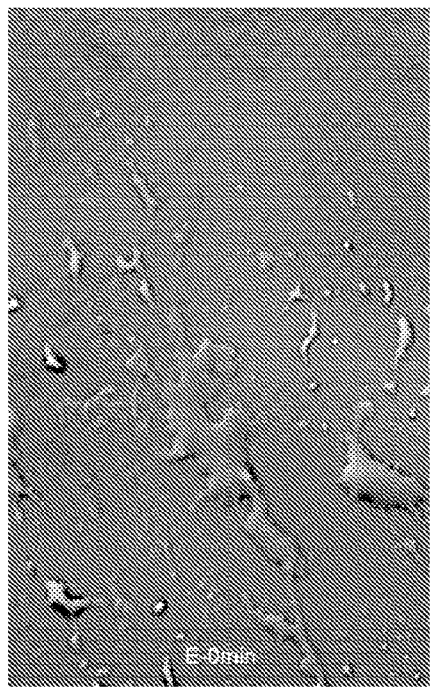
FIG. 2A is a digital photograph of a human fingerprint applied to a cured coating at a microscope setting of 500×.
Figure 2B:
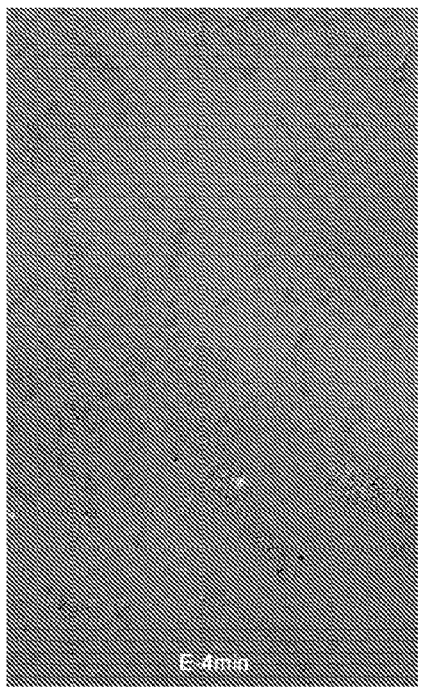
FIG. 2B is a digital photograph of the human fingerprint applied to the cured coating of FIG. 2A four minutes later.

The visibility of an actual or simulated fingerprint initially or as a function of time can also be determined by use of visible inspection. For example, with reference to FIG. 1A and FIG. 1B, the visibility of a fingerprint can be captured by use of a microscope equipped with a digital camera, using various magnifications. With reference to FIG. 1A, a fingerprint is initially highly visible at a magnification of for example 12×. However, with reference to FIG. 1B, this same fingerprint is substantially less visible after a duration of time (e.g. 5 minutes). With reference to FIG. 2A, at an even high magnification of for example 500×, oil droplets of the fingerprint are initially evident on the cured coating surface. However, with reference to FIG. 2B, these oil droplets are not evident after a duration of time (e.g. 4 minutes), surmised to be absorbed by the cured coating composition.

In favored embodiments described herein, the cured coating maintains its properties and in particular the property of exhibiting reduced fingerprint visibility after aging for 500 hours at 80° C. In some embodiments, the ratio may increase. However, the ratio is still less than 0.80, or 0.70, or 0.60, or 0.50.

GLOSSARY

For the following defined terms, these definitions shall be applied, unless a different definition is given in the claims or elsewhere in the specification.

"Free-radically polymerizable" refers to the ability of monomers, oligomers, polymers or the like to participate in crosslinking reactions upon exposure to a suitable source of free radicals.

"(Meth)acryl" refers to functional groups including acrylates, methacrylates, acrylamides, methacrylamides, alpha-fluoroacrylates, thioacrylates and thio-methacrylates. A preferred (meth)acryl group is acrylate.

"Monovalent perfluoropolyether moiety" refers to a perfluoropolyether chain having one end terminated by a perfluoroalkyl group.

Unless otherwise noted, "HFPO—" refers to the end group $F(CF(CF_3)CF_2O)aCF(CF_3)$— of the methyl ester $F(CF(CF_3)CF_2O)aCF(CF_3)C(O)OCH3$, wherein "a" averages 2 to 15. In some embodiments, a averages between 3 and 10 or a averages between 5 and 8. Such species generally exist as a distribution or mixture of oligomers with a range of values for a, so that the average value of a may be non-integer. In one embodiment a averages 6.2. This methyl ester has an average molecular weight of 1,211 g/mol, and can be prepared according to the method reported in U.S. Pat. No. 3,250,808 (Moore et al.), with purification by fractional distillation.

The recitation of numerical ranges by endpoints includes all numbers subsumed within the range (e.g. the range 1 to 10 includes 1, 1.5, 3.33, and 10).

Objects and advantages of this invention are further illustrated by the following examples, but the particular materials and amounts thereof recited in these examples, as well as other conditions and details, should not be construed to unduly limit this invention.

EXAMPLES

All parts, percentages, ratios, etc. in the examples are by weight, unless noted otherwise. Solvents and other reagents used were obtained from Sigma-Aldrich Chemical Company; Milwaukee, Wis. unless specified differently.
Test Methods
Fingerprint Test To test the samples, a background haze was measured using a Haze-Gard Plus from BYK-Gardner (Columbia, Md.) then a simulated fingerprint was applied to the coating and then the haze was again measured using the Haze-Gard Plus. The simulated fingerprint was applied as follows. A solution was prepared by mixing 0.35 parts Crisco Shortening (J.M. Smucker Company, Orrville, Ohio) with 0.35 parts $C_{57}H_{104}O_6$ (obtained from Sigma Chemical Co., St. Louis, Mo. under the trade designation "Triolein" and 8.0 parts isopropyl alcohol. The solution was coated on DuPont Teijin PET film using a #26 wire wound rod which was rapidly pulled across the film. The sample was allowed to dry for 30 min. A #5 stopper (from VWR Scientific) having a bottom outer diameter of about 2.3 cm was attached to a plunger (2.5 pound plunger from Summer Optical, Fort Washington, Pa.). The plunger with stopper was pressed onto the coated PET (inking the stopper). Next the plunger was pressed onto the sample to be tested. The haze of the applied simulated fingerprint was measured immediately and again after 60 minutes. The background haze, the initial haze after applying the simulated fingerprint and the haze 60 minutes after applying the fingerprint were recorded and the ratio of the haze after 60 minutes to the initial haze was determined.
Steel Wool Durability Test The abrasion resistance of the cured films was tested cross-web to the coating direction by use of a mechanical device capable of oscillating a steel wool sheet adhered to a stylus across the film's surface. The stylus oscillated over a 60 mm wide sweep width at a rate of 210 mm/sec (3.5 wipes/sec) wherein a "wipe" is defined as a single travel of 60 mm. The stylus had a flat, cylindrical base geometry with a diameter of 3.2 cm. The stylus was designed for attachment of weights to increase the force exerted by the steel wool normal to the film's surface. The #0000 steel wool sheets were "Magic Sand-Sanding Sheets" available from Hut Products Fulton, Mo. The #0000 has a specified grit equivalency of 600-1200 grit sandpaper. The 3.2 cm steel wool discs were die cut from the sanding sheets and adhered to the 3.2 cm stylus base with 3M Brand Scotch Permanent Adhesive Transfer tape. A single sample was tested for each example, with a 500 g weight and 50 wipes. The sample was then visually inspected for scratches.
Materials
Synthesis of Non-Ionic Surfactant To a 250 ml round bottom flask equipped with an overhead mechanical stirrer, temperature probe and Dean-Stark trap with condenser was added 50 grams (0.177 moles) 90% oleic acid (technical grade), 0.168 moles (0.95 equivalents) of diethyleneglycol monoethyl ether, 100 grams cyclohexane, and 1.5 grams para-toluene sulfonic acid. The batch was heated to reflux with moderate agitation to azeotrope off water from the esterification and water was collected in a clean-stark trap. After four hours of reflux, a total of 3 grams of water had been collected and no further water was being produced. Liquid chromatography showed a small amount of residual oleic acid.

The reaction was allowed to cool to room temperature. To the flask a mixture of 60 grams water and 6 grams sodium carbonate was added and 4.5 grams isopropyl alcohol was added. The contents of the flask were mixed well and then allowed to phase separate in a separatory funnel. The lower aqueous layer was removed. Then a mixture of 70 grams saturated sodium chloride in water was added, the flask shaken, and the contents allowed to separate. The lower aqueous layer was removed. The residual cyclohexane solvent was removed from the ester product using a rotary-evaporator to provide 58 g of a light yellow colored product. Liquid chromatography showed no residual oleic acid. The calculated hydrophilic-lipophilic balance (HLB) of this surfactant is 4.7.

Synthesis of Polymerizable Surfactant (Brij O2 Acrylate)

To a 11 round bottom flask equipped with magnetic stirbar and heat-tape wrapped Dean-Stark trap with condenser was added 200 g (0.561 mol) Brij O2, 41.22 g (0.572 mol) acrylic acid, 0.05 g BHT (~500 ppm based on solids), 0.05 g phenothiazine, and 300 g heptane. The reaction was heated in an oil bath. When the internal temperature was about 80° C., 2.96 g (0.0308 mol) methanesulfonic acid was added to the reaction. The oil bath was raised to 120° C., and the heating tape was turned on. After 4 h of refluxing, 10.0 ml of water was collected, the reaction was cooled to 80° C., and 4.69 g (0.0314 mol) triethanolamine was added with stirring to the reaction. After 5 min, 120 g of deionized water was added to the reaction, which was stirred for 1 min, transferred to a separatory funnel, shaken and allowed to settle overnight. Three layers resulted: a clear aqueous layer (84.2 g), and an interphase with a brown gooey mixture (48.7 g), and a top light brown layer. The top layer was isolated and heated in a flask with 120 g of 2% aqueous sodium carbonate to 80° C. T mixture was allowed to settle in the separatory funnel with heating to 75° C. The layers were separated, and the aqueous layer was re-extracted with 50 g of heptane. The combined heptane layers were dried over anhydrous magnesium sulfate, filtered and concentrated on a rotary evaporator to yield 209.7 g (91.1% yield) of a light brown oil, which was characterized by $^1$H NMR. (Calculated HLB=5.6 assuming two ethylene oxide repeat units.)

Preparation of Brij O3 Acrylate

A 1.0-liter round bottom flask was charged with 195.14 g (0.4871 mols) Brij O3, 200 g heptane, 35.80 g (0.4967 mols) acrylic acid, 0.046 g BHT and 0.046 g phenothiazine. The reaction was heated to 120° C. in a silicone oil bath. The flask was topped by a Dean-Stark (D-S) trap wrapped in heat tape with a condenser atop the D-S trap. When the reaction was warm, 2.96 g (0.0314 mols) of methanesulfonic acid was charged and reaction was run for 9 hours, at which time 8.7 mL water had collected in the D-S trap. The reaction was cooled to 95° C., and 4.69 g (0.0314 mols) of triethanolamine was added, and was stirred for 5 minutes. The reaction was then washed successively with 1) 120 g of deionized water, 2) 120 g of 2% aqueous sodium carbonate, and the organic (top) layer was dried over anhydrous magnesium sulfate. The reaction was filtered through a C porosity flitted funnel through a pad of Celite, the pad washed with two 30 mL portions of heptane, and was concentrated on a rotary evaporator at aspirator pressure at up to 95° C. to yield 201.9 g of product. (Calculated HLB=7.0 assuming three ethylene oxide repeat units.)

Preparation of Brij O5 Acrylate

A 1.0-liter round bottom flask was charged with 250 g (0.5117 mols) Brij O5, 250 g heptane, 37.66 g (0.5220 mols) acrylic acid, 0.0575 g MEHQ and 0.0575 g Prostab 5198 inhibitor. The reaction was heated to 120° C. in a silicone oil bath. The flask was topped by a Dean-Stark (D-S) trap wrapped in heat tape with a condenser atop the D-S trap. When the reaction was warm, 3.42 g (0.03558 mols) of methanesulfonic acid was charged and reaction was run for 4.5 hours. 9.4 mL had collected in the D-S trap. The reaction temperature was dropped to 90° C. and 5.55 g (0.0372 mols) of triethanolamine was added. The reaction was then stirred for 5 minutes at which point the reaction was heated to 70° C. and 100 g of distilled water was added. The reaction was poured into a separatory funnel, resulting in a yellow top layer and whitish bottom layer. The layers were allowed to separate over 1 hour. 25 g of saturated brine was added to help clean out the bottom layer and the separatory funnel was tilted a few times and left to separate overnight. The organic layer weighed 498.8 g. The top layer was heated in a 90° C. silicone oil bath while stirred. When heated to 70° C., 100 g of 2% $Na_2CO_3$ solution was added along with 6 g of a 1:5 mixture of 2% $Na_2CO_3$: organic layer used to determine a best-method for the split. The solution was stirred for 3.5 minutes to an internal temperature of 65° C. and then poured into a 1-liter separatory funnel. By a combination of heating and stirring, a clean lower layer, whitish middle, and yellow top layer appeared. The next day a good separation had occurred and 20 g silica gel was added to the organic layer and stirred at 50° C. in a silicone oil bath. Six type C flitted Buchner funnels were used to filter the material (funnels were used until too plugged to filter). The funnels were rinsed with heptane and the material was concentrated on a rotary evaporator at 93° C. and 28 in Hg. The yield was 212.24 g. (Calculated HLB=9.2 assuming five ethylene oxide repeat units.)

Preparation of Brij O10 Acrylate

A 1.0-liter round bottom flask was charged with 250 g (0.352 mols) Brij O10, 250 g heptane, 15.88 g acrylic acid (0.359 mols), 0.0552 g MEHQ and 0.0552 g Prostab 5198 inhibitor. The reaction was heated to 120° C. in a silicone oil bath. The flask was topped by a Dean-Stark trap wrapped in heat tape with a condenser atop the D-S trap. When the reaction was warm, 3.58 g (0.03725 mols) of methanesulfonic acid was charged and reaction was run for 8 hours. The next day, 8.2 mL had collected in the D-S trap. The reaction was heated to 52° C. and 5.72 g (0.0383 mols) of triethanolamine was added. The reaction was then stirred for 5 minutes at which point the reaction was heated to 80° C. and 50 g of water was added. A separation over several hours resulted in a small bottom layer (~18 g). The top layer was treated with 50 g of silica gel and then filtered through a type C fritted Buchner funnel. 10 different filters were needed to complete the filtration due to clogging. The next day the material was condensed on a rotary evaporator at up to 90° C. and 85 kPa (25 in. Hg) vacuum to provide a light brownish oil with a small amount of particles. (Calculated HLB=12.5 assuming ten ethylene oxide repeat units.)

Components Comprising Hydrophobic Group Utilized in Synthesis of Additive

Brij S20—primary component $C_{18}H_{37}(OCH_2CH_2)_{20}OH$ obtained from Croda Inc., Edison, N.J. Reported by manufacturer to have an HLB=15.3.

Component Comprising Low Surface Energy Perfluoropolyether Group

HFPO—C(O)N(H)CH$_2$CH$_2$OH (HFPO amidol) with molecular weight 1344 was made by a procedure similar to that described in U.S. Pat. No. 7,094,829 (Audenaert et al.), the disclosure of which is incorporated herein by reference, for the synthesis of HFPO-oligomer alcohols with the exception that HFPO methyl ester $F(CF(CF_3)CF_2O)_aCF(CF_3)C(O)CH_3$ with a=6.2 was replaced with $F(CF(CF_3)CF_2O)_aCF(CF_3)C(O)OCH_3$ where a=6.85. The HFPO methyl ester was prepared according to the method reported in U.S. Pat. No. 3,250,808 (Moore et al.), the disclosure of which is incorporated herein by reference, with purification by fractional distillation.

Other Components

Isocyanatoethyl acrylate (TEA) was obtained from CBC America Corp, Commack, N.Y.

Hydroxybutyl acrylate was obtained from TCI America, Portland, Oreg.

Lauryl acrylate was obtained as SR335 from Sartomer, Exton, Pa.

Nalco 2327—an aqueous dispersion of 20 nm silica nanoparticles (41% solids in water, stabilized with ammonia) obtained from Nalco Chem. Co. Naperville, Ill.

PROSTAB 5198—4-hydroxy-2,2,6,6-tetramethyl-1-piperidinyloxy (commonly referred to as 4-hydroxy-TEMPO) obtained from CIBA Specialty Chemicals, Tarrytown, N.Y.

Sartomer SR444—pentaerythritol triacrylate (PET3/4) obtained from Sartomer Company, Exton, Pa.

Sartomer SR344—polyethylene glycol (400) diacrylate obtained from Sartomer Company, Exton, Pa.

BHT—2,6-di-t-butyl-4-methylphenol obtained from Sigma Aldrich, Milwaukee, Wis.

Esacure One—2-hydroxy-1-{1-[4-(2-hydroxy-2-methylpropionyl)-phenyl]-1,3,3-trimethyl-indan-5-yl}-2-methylpropan-1-one from Lamberti SPA, Gallarate, Italy.

VAZO 67—Polymerization initiator obtained from E.I. du Pont de Nemours and Company, Wilmington, Del.

Des N100—Polyisocyanate Desmodur™ (Des) N100 obtained from Bayer Polymers LLC, of Pittsburgh, Pa.

DBTDL—Dibutyltin dilaurate obtained from Sigma Aldrich, Milwaukee, Wis.

DuPont Teijin PET: Polyethylene terephthalate film 618-500 obtained from DuPont Teijin Films U.S. Limited Partnership, Hopewell, Va.

Phenothiazine, ethyl acetate, ethanol, isopropyl alcohol, methanesulfonic acid, and triethanolamine were obtained from Sigma-Aldrich, Milwaukee, Wis.

TEGO® Rad 2100 was obtained from Evonik Tego Chemie GmbH, Essen, Germany.

Brij O2 primary component $C_{18}H_{35}(OCH_2CH_2)_2OH$ (oleyl alcohol with 2 ethyleneoxy groups), (calculated HLB 5.4), Brij O3—primary component $C_{18}H_{35}(OCH_2CH_2)_3OH$ (oleyl alcohol with 3 ethyleneoxy groups), (calculated HLB 7.0), Brij O5—primary component $C_{18}H_{35}(OCH_2CH_2)_5OH$ (oleyl alcohol with 5 ethyleneoxy groups) (calculated HLB 9.3), Brij O10—primary component $C_{18}H_{35}(OCH_2CH_2)_{10}OH$ (oleyl alcohol with 10 ethyleneoxy groups) (calculated HLB 12.9) were obtained from Croda Inc., Edison, N.J.

Preparation of HFPO Amidol Acrylate

HFPO—$C(O)N(H)CH_2CH_2OH$ (HFPO amidol) with molecular weight 1420 was made by a procedure similar to that described in U.S. Pat. No. 7,098,429 (Audenaert, et al.), the disclosure of which is incorporated herein by reference, for the synthesis of HFPO-oligomer alcohols with the exception that the HFPO methyl ester $F(CF(CF_3)CF_2O)_aCF(CF_3)C(O)OCH_3$ with a=6.2 was replaced with $F(CF(CF_3)CF_2O)_aCF(CF_3)C(O)OCH_3$ where a=7.3. The HFPO methyl ester was prepared according to the method reported in U.S. Pat. No. 3,250,808 (Moore, et al.), the disclosure of which is incorporated herein by reference, with purification by fractional distillation.

HFPO amidol acrylate was made from the HFPO amidol using the procedure described in Preparative Example 2 of U.S. Pat. No. 6,995,222 (Buckanin, et al.).

Preparation of Surface Modified Nanosilica Dispersion 305 grams of Nalco 2327 was added to a 1-liter reaction flask. 486 grams of 1-methoxy-2-propanol was added to the reactor with stirring. 19.38 grams of 3-methacryloxypropyltrimethoxysilane was added slowly to the reactor with stirring. 0.15 grams of a 5% aqueous of PROSTAB 5198 was added to the reactor with stirring. The mixture was stirred 18 hours at 90° C.

The reaction mixture was heated under vacuum and the 1-methoxy-2-propanol/water azeotrope was distilled off with any necessary addition of 1-methoxy-2-propanol to remove substantially all of the water. The surface modification reaction resulted in a mixture containing 40% surface modified silica (20 nm average particle size), by weight, in 1-methoxy-2-propanol.

Synthesis of Additive A (Additive 5 from US Patent Application Publication No. US2012/0154811)

A solution of Des N100/0.25 HFPO/0.25 $C_{18}H_{37}(OCH_2CH_2)_{20}OH$/0.55 PET3A was prepared as follows. A 200 ml roundbottom flask equipped with magnetic stir bar was charged with 6.25 g (0.03272 eq, 191 EW) Des N100, 29.8 g methyl ethyl ketone (MEK). The reaction was swirled to dissolve the reactant, the flask was placed in a oil bath at 55 degrees Celsius, and fitted with a condenser under dry air. Twenty-two microliters of a 10% dibutyltin dilaurate (DBTDL) solution in MEK was added to the reaction (50 ppm based on total solids). Over about 20 min, 10.99 g (0.008184 eq, 0.25 equivalent fraction with respect to the Des N100, 1344 EW) $F(CF(CF_3)CF_2O)_{6.85}CF(CF_3)C(O)NHCH_2CH_2OH$ was added to the reaction via addition funnel. Two hours after the addition was complete, 8.66 g (0.008184 eq, 0.25 equivalent fraction with respect to the Des N100, 1058.5 EW) $C_{18}H_{37}(OCH_2CH_2)_{20}OH$ (Brij S20) was added over 20 min, followed by rinsing of the addition funnel with 5.0 g MEK. After reaction overnight, the following afternoon, 0.013 g BHT, followed by 8.90 g (0.018 eq, 0.55 equivalent fraction with respect to the Des N100, at 494.3 EW) Sartomer SR444C (PET3A), was added in one portion to the reaction which was allowed to proceed overnight. (The actual OH equivalent weight of the SR444C was 421.8, but 494.3 was used in calculations for all lots of SR444C, so that for any given material made, the weight percentage of SR444C remained constant). The reaction was monitored by FTIR and initially showed an isocyanate group absorption at 2273 $cm^{-1}$. This absorption was gone after reaction overnight, and 1.41 g of MEK was added to compensate for MEK lost during the reaction to adjust the final solids to 50% solids.

Synthesis of Additive B

In a clean glass reaction bottle were taken 0.125 parts of dodecanethiol, 16.47 parts of a 50% solids solution of HFPO amidol-acrylate in EtOAc (Ethyl acetate), 18.54 parts of a 50% solids solution of Hydroxybutyl acrylate in EtOAc, 15 parts of a 50% solution of Lauryl acrylate in Ethyl Acetate, 0.125 parts of VAZO 67 and 25 parts of EtOAc. The solution was purged with nitrogen for two minutes. The bottle was sealed and placed in a constant temperature water bath with a rotating device. The solution was heated at 65° C. for 16 hours and then cooled to room temperature. A medium viscous polymer solution was obtained.

Half of this 75.25 weight parts of solution (37.625 weight parts, containing 12.62 weight parts solids) was charged into a 50 mL amber jar equipped with a magnetic stirbar along with 75 microliters of 10% DBTDL in MEK, and 0.25 weight parts of IEM and placed in an oil bath at 55° C. for 1 hr 15 min. At that time, the reaction was monitored for completeness by disappearance of an isocyanate peak in the FTIR spectrum of the sample. The reaction was adjusted to 30% solids with 5.29 weight parts ethyl acetate.

Examples 1-7

Surface modified nanosilica in Sartomer SR444/SR 344 was prepared by mixing 1:1 Sartomer SR444 and SR 344 and the 1-methoxy-2-propanol dispersion of surface modified nanosilica described in "Preparation of Surface Modified Nanosilica Dispersion" with weight ratios given under "Solution 1" in following table. The 1-methoxy-2-propanol was then evaporated using a rotary-evaporator resulting in the Hardcoat Composition.

| Material | Solution 1 | Hardcoat Composition |
| --- | --- | --- |
| Surface modified nanosilica | 61 | 38.4 |
| SR 444 | 19.5 | 30.8 |
| SR 344 | 19.5 | 30.8 |

Coating solutions were made by dissolving 83.43 parts by weight of the Hardcoat Composition, 1.54 parts of Esacure One and the following surfactant and materials in the table below at the indicated concentrations in ethanol at 62% solids.

| Example | Non-Ionic Surfactant | Brij O2 Acrylate | Wt-Ratio* | Wt-Ratio** | Additive Type - (parts) |
| --- | --- | --- | --- | --- | --- |
| Ex. A | 15 | 0 | | | A - 0.033 |
| Ex. B | 13.1 | 1.9 | 6.89:1 | | A - 0.033 |
| Ex. C | 11.25 | 3.75 | 3:1 | | A - 0.033 |
| Ex. D | 9.4 | 5.6 | 1.68:1 | | A - 0.033 |
| 1 | 7.5 | 7.5 | 1:1 | 1:1 | A - 0.033 |
| 2 | 5.6 | 9.4 | 1:0.6 | 1.68:1 | A - 0.033 |
| 3 | 3.75 | 11.25 | 1:0.33 | 3:1 | A - 0.033 |
| 4 | 1.9 | 13.1 | 1:0.14 | 6.89:1 | A - 0.033 |
| 5 | 0 | 15 | | | A - 0.033 |
| 6 | 5.6 | 9.4 | 1:0.6 | 1.68:1 | B - 0.033 |
| 7 | 5.6 | 9.4 | 1:0.6 | 1.68:1 | TEGO ® Rad 2100 0.033 |

*of free surfactant to polymerizable surfactant (column 2 divided my column 3)
**of polymerizable surfactant to free surfactant (column 3 divided by column 2)

These solutions were coated on a 127 micron (5 mil) primed PET film prepared according to Example 29 of U.S. Pat. No. 6,893,731. The coatings were coated at a dry thickness of about 15 microns using a #26 wire wound rod. The coatings were dried in an air circulating oven at 105° C. for two minutes. The coatings were then were UV cured using a nitrogen purged Fusion Light Hammer 6 with a 500 watt Fusion H bulb (Fusion UV Systems, Inc., Gaithersburg, Md.) and placed on the conveyer at 12 m/min (40 ft/min). The Fingerprint Test and the Steel Wool Durability Tests were performed. The initial fingerprint (FP), the fingerprint after 60 min, their ratio (FP Ratio), the background haze and the results of the steel wool tests are reported in the table below.

| Example | 0 min FP | 60 min FP | FP Ratio | Haze | Steel Wool Durability |
| --- | --- | --- | --- | --- | --- |
| Ex. A | 12.98 | 9.60 | 0.74 | 0.22 | Poor |
| Ex. B | 11.51 | 9.18 | 0.80 | 0.22 | Fair |
| Ex. C | 8.51 | 5.54 | 0.65 | 0.21 | Fair |
| Ex. D | 15.00 | 9.37 | 0.62 | 0.20 | Fair |
| 1 | 15.70 | 10.18 | 0.65 | 0.15 | Good |
| 2 | 15.80 | 10.93 | 0.69 | 0.19 | Fair |
| 3 | 15.04 | 11.92 | 0.79 | 0.19 | Good |
| 4 | 18.82 | 15.84 | 0.84 | 0.24 | Very Good |
| 5 | 17.70 | 16.24 | 0.92 | 0.18 | Very Good |
| 6 | 17.60 | 11.13 | 0.63 | 0.15 | Good |
| 7 | 16.18 | 12.16 | 0.75 | 0.20 | Good |

| Example | Non-Ionic Surfactant | Polymerizable surfactant Type | Polymerizable surfactant amount | Wt-Ratio* | Wt-Ratio** | Additive Type-(parts) |
| --- | --- | --- | --- | --- | --- | --- |
| 8 | 8.7 | Brij O2 Acrylate | 6.3 | 1.4:1 | 0.72:1 | A-0.033 |
| 9 | 5 | Brij O2 Acrylate | 10 | 1:0.5 | 2:1 | A-0.033 |
| 10 | 8.7 | Brij O3 Acrylate | 6.3 | 1.4:1 | 0.72:1 | A-0.033 |
| 11 | 5 | Brij O3 Acrylate | 10 | 1:0.5 | 2:1 | A-0.033 |
| 12 | 8.7 | Brij O5 Acrylate | 6.3 | 1.4:1 | 0.72:1 | A-0.033 |
| 13 | 5 | Brij O5 Acrylate | 10 | 1:0.5 | 2:1 | A-0.033 |
| 14 | 8.7 | Brij O10 Acrylate | 6.3 | 1.4:1 | 0.72:1 | A-0.033 |
| 15 | 5 | Brij O10 Acrylate | 10 | 1:0.5 | 2:1 | A-0.033 |

*of free surfactant to polymerizable surfactant (column 2 divided my column 4)
**of polymerizable surfactant to free surfactant (column 4 divided by column 2)

The examples 8-15, were coated, cured and tested according to the same procedure as Samples 1-7

| Example | 0 min FP | 60 min FP | FP Ratio | Haze | Steel Wool Durability |
|---|---|---|---|---|---|
| 8 | 16.68 | 12.046 | 0.72 | 0.32 | Fair |
| 9 | 20.72 | 15.2 | 0.73 | 0.19 | Good |
| 10 | 23.82 | 17.38 | 0.73 | 9.85 | Fair |
| 11 | 22.22 | 18.74 | 0.84 | 9.53 | Fair |
| 12 | 21.08 | 16.72 | 0.79 | 0.27 | Fair |
| 13 | 21.92 | 16.5 | 0.75 | 0.26 | Fair |
| 14 | 20.98 | 15.84 | 0.76 | 0.29 | Good |
| 15 | 22.66 | 20.3 | 0.90 | 0.48 | Good |

A Steel Wool Durability rating of "fair" or better is equivalent no evidence of scratching or only a few scratches (e.g. 1-3) when tested using a weight of 300 g and 10 wipes.

What is claimed is:

1. A coating composition comprising:
a polymerizable resin composition,
a non-ionic unpolymerizable surfactant having an hydrophilic-lipophilic balance ranging from 2 to 6, and a polymerizable surfactant comprising an alkyl or alkenyl group having at least 12 carbon atoms and a free-radically polymerizable group; wherein the surfactants are present at a concentration of greater than 10 wt.-% and no greater than 25 wt.-% solids of the coating composition and the non-ionic unpolymerizable surfactant and polymerizable surfactant are present at a weight ratio of less than 1.5 to 1; wherein the coating composition is a hardcoat after curing.

2. The coating composition of claim 1 wherein the polymerizable surfactant is derived from a non-ionic surfactant.

3. The coating composition of claim 1 wherein the polymerizable surfactant comprises a (meth)acrylate group.

4. The coating composition of claim 1 wherein the polymerizable surfactant has a hydrophilic-lipophilic balance ranging from 2 to 13.

5. The coating composition of claim 1 wherein the polymerizable surfactant comprises ethoxylate repeat units, propoxylate repeat units, or a mixture thereof.

6. The coating composition of claim 1 wherein the polymerizable surfactant has the formula:

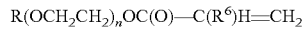

$R(OCH_2CH_2)_nOC(O)-C(R^6)H=CH_2$ wherein R is an alkyl group having at least 12 carbon atoms;
$R^6$ is hydrogen or alkyl having from 1 to 4 carbon atoms; and
n ranges from 1 to less than 20.

7. The coating composition of claim 1 wherein the non-ionic unpolymerizable surfactant is a liquid at ambient temperature.

8. The coating composition of claim 1 wherein the non-ionic unpolymerizable surfactant comprises an alkyl or alkenyl group having at least 12 carbon atoms.

9. The coating composition of claim 8 wherein the non-ionic unpolymerizable surfactant comprises ethoxylate repeat units, propoxylate repeat units, or a mixture thereof.

10. The coating composition of claim 1 wherein the coating composition further comprises an additive comprising a silicone group, or a fluorinated group, or a combination thereof.

11. The coating composition of claim 10 wherein the additive comprises a silicone group or a fluorinated group and a hydrophobic group comprising an alkyl group having greater than 6 carbon atoms.

12. The coating compositions of claim 10 wherein the additive comprises a silicone group or a fluorinated group and further comprises primary hydroxyl groups.

13. The coating composition of claim 11 wherein the additive comprises a hydrophobic group comprising an alkyl group having greater than 12 carbon atoms and at least one (meth)acrylate group.

14. The coating composition of claim 13 wherein the additive further comprises ethoxylate repeat units, propoxylate repeat units, or a mixture thereof bonded to the hydrophobic group.

15. The coating composition of claim 11 wherein the additive comprises a monovalent perfluoropolyether moiety.

16. The coating composition of claim 10 wherein the additive comprises a polyurethane backbone or a poly(meth)acrylate backbone.

17. The coating composition of claim 1 wherein the polymerizable resin comprises at least one monomer comprising two or more (meth)acrylate groups and ethoxylate repeat units, propoxylate repeat units, or a mixture thereof.

18. An article comprising the coating composition of claim 1, wherein the coating composition is cured.

19. The article of claim 18 wherein the cured coating exhibits a ratio of simulated fingerprint visibility at 60 minutes to initial simulated fingerprint visibility of less than 0.80.

20. The coating composition of claim 1 wherein the coating composition is cured and exhibits no greater than 3 scratches when tested according to the Steel Wool Abrasion Resistance test method using a weight of 300 g and 10 wipes.

* * * * *

UNITED STATES PATENT AND TRADEMARK OFFICE
CERTIFICATE OF CORRECTION

PATENT NO. : 9,701,850 B2
APPLICATION NO. : 14/394318
DATED : July 11, 2017
INVENTOR(S) : Richard Pokorny et al.

It is certified that error appears in the above-identified patent and that said Letters Patent is hereby corrected as shown below:

In the Specification

Column 2
Line 22, delete "apolymerizable" and insert -- a polymerizable --, therefor.

Column 4
Line 15, after "described" insert -- . --.

Column 7
Line 29, delete "perflurorpolyether" and insert -- perfluoropolyether --, therefor.

Column 8
Line 10, delete "perflurorpolyether" and insert -- perfluoropolyether --, therefor.

Column 9
Line 40-41, delete "perfluororalkyl" and insert -- perfluoroalkyl --, therefor.

Column 10
Line 41, delete "glyceral" and insert -- glycerol --, therefor.

Column 10
Line 67, delete "and or" and insert -- and/or --, therefor.

Column 11
Line 24, after "thereof" insert -- . --.

Column 24
Line 27, delete "roundbottom" and insert -- round bottom --, therefor.

Signed and Sealed this
Third Day of April, 2018

Andrei Iancu
*Director of the United States Patent and Trademark Office*

CERTIFICATE OF CORRECTION (continued)
U.S. Pat. No. 9,701,850 B2

In the Claims

<u>Column 28 Claim 12</u>
Line 19, delete "compositions" and insert -- composition --, therefor.